(No Model.)
J. H. RATHBUN.
TAPPING DEVICE.
No. 318,654. Patented May 26, 1885.
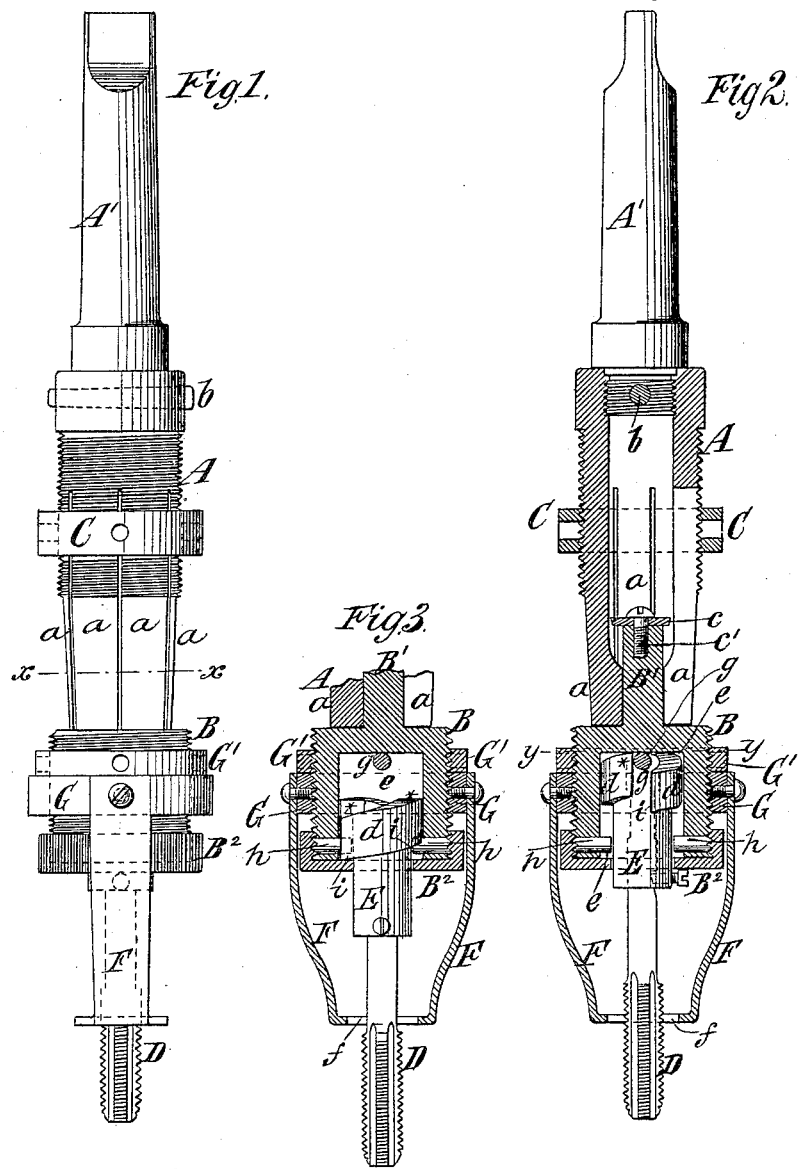

UNITED STATES PATENT OFFICE.

JOHN H. RATHBUN, OF NEW YORK, N. Y., ASSIGNOR OF ONE-HALF TO CORNELIUS H. DE LAMATER, GEORGE H. ROBINSON, AND WILLIAM DE LAMATER, ALL OF SAME PLACE.

TAPPING DEVICE.

SPECIFICATION forming part of Letters Patent No. 318,654, dated May 26, 1885.

Application filed October 23, 1884. (No model.)

*To all whom it may concern:*

Be it known that I, JOHN H. RATHBUN, of the city and county of New York, in the State of New York, have invented a new and useful Improvement in Tapping Devices, of which the following is a specification.

My invention relates to devices which may be secured in or to the spindle of a drilling-machine, lathe, or tapping-machine, and by which a tap may be turned in one direction to tap a hole, and then turned in a reverse direction to back out the tap.

In its most approved form my device or apparatus comprises a chuck, which may be secured on or in the spindle of the machine, a head or holder in which the tap is secured, and a driver which has a shank fitting the chuck, and a cavity receiving within it the tap head or holder, the tap-driver being constructed to engage with the tap head or holder and turn the latter in one or other direction to screw in or back out the tap. I also provide a stop, which is adjustably secured upon the tap-driver, and may be set to permit the entrance of the tap to any predetermined distance.

An important object of the invention is to so construct the chuck and the shank of the tap-driver which is received therein that the chuck will have a sufficiently strong engagement with the shank to turn the tap until the latter has entered a distance limited by the stop, and will thereafter turn on the shank without turning the tap or tap-driver, their further turning being prevented by the stop butting up against the work.

The invention consists in novel features of construction and combinations of parts, hereinafter described, and pointed out in the claims.

In the accompanying drawings, Figure 1 is a side view of a device embodying my invention. Fig. 2 is an axial section representing the tap-driver as in engagement with the tap head or holder for driving the tap forward. Fig. 3 is a similar section of the tap-driver and parts below it, representing the tap-driver as in engagement with the tap head or holder for backing out the tap. Fig. 4 is a transverse section on the dotted line $x\,x$, Fig. 1; and Fig. 5 is a similar section on the dotted line $y\,y$, Fig. 2.

Similar letters of reference designate corresponding parts in all the figures.

A designates the chuck, which may be made of steel. It comprises a number of elastic fingers or spring-jaws, $a$, (here shown as five,) forming between them a polygonal socket. Any number of jaws may be provided to form a polygonal socket having any desired number of sides. The chuck here shown has a shank, A', which is intended to fit into the spindle of a drilling-machine, lathe, or tapping-machine, and which is detachably secured to the chuck by being screwed thereinto, a safety-pin, $b$, being inserted through them to prevent the accidental turning of the chuck on the shank. When the shank is detachably secured to the chuck, provision is afforded for using the chuck with any one of a number of shanks fitted to the spindles of different machines; but when the chuck is to be used with only one machine the shank A' may be formed integral with or permanently connected with the chuck.

B designates the tap-driver, which consists of a cylindric block or piece having projecting from its upper end a shank, B', which is polygonal to fit the polygonal socket of the chuck. As here shown, the chuck A is chambered out above its lower portion, and the shank B' of the tap-driver is held against detachment therefrom by a washer or cap, $c$, secured upon its upper end by a screw, $c'$.

In assembling the parts the shank B' is inserted into the chuck A before the chuck-shank A' is screwed thereinto, and a screw-driver may be inserted down through the chuck to insert the screw $c'$. The exterior of the split chuck A is screw-threaded, and thereon is fitted a nut or collar, C, which may be adjusted up and down thereon to vary the length of the spring fingers or jaws $a$, (which are left free to spring outward,) and so regulate the firmness with which the chuck holds the shank B' of the tap-driver B. When the ring or collar C is screwed down near the lower end of the thread on the chuck, the chuck will drive the tap very strongly, and it will require a great resistance to cause the fingers $a$ to spring, as is necessary to allow the chuck to turn on the shank B'. When the ring or collar C is adjusted to a position near the upper end of the screw-thread, the spring-fingers $a$ will yield much more readily and a much less resistance will suffice to arrest the tap and cause the chuck to turn idly on the shank B'.

D designates a tap of ordinary form, and which is secured firmly in a head or tap-holder, E. This head or holder has upon its exterior spiral projections $d$, which form sections of screw-threads, and which externally fit a cylindric cavity, $e$, in the tap-driver B. The lower end of the tap-driver B is closed by a screw-cap, $B^2$, which, as shown, has a milled edge, whereby it may be readily turned by hand, and through this cap the smaller portion of the tap head or holder E works. The adjustable stop for the tap, as here shown, consists of a bail or stirrup, F, having at the lower portion a hole or opening, $f$, through which the tap D works, and having its upper portions secured to a ring or band, G, which is screwed upon the exterior of the tap-driver B and held in any desired position thereon by a jam-nut, G'. By adjusting the band or ring and then securing it in place by the lock-nut the stop F may be adjusted or set so as to permit the tap D to enter the work to any desired depth before it is arrested by the stop bringing up against the work.

In the upper part of the cavity $e$ in the tap-driver B is a cross-pin, $g$, and projecting inward into the cavity from opposite sides, and at the lower part thereof, are pins $h$, forming projections which extend to the exterior of the head or holder E. The pin $g$ is adapted to engage with the shoulders or stops *, formed by the ends of the spiral projections, which are presented uppermost when the driver B is turned in one direction, and when the driver is raised relatively to the tap head or holder E and turned in a reverse direction the pins $h$ engage with the shoulders or stops $i$, formed by the lower ends of the projections $d$.

The operation of the device is as follows: The stop F having been adjusted to the proper position, the chuck and tap-driver A B are turned, and the pin $g$ engaging with the shoulders or stops * the tap is turned to drive it forward into the work. When the stop F reaches the work, it bears thereon, and thereby increases the frictional resistance to the turning of the tap to such a degree that the chuck A will spring and turn on the shank A'. The direction of rotation of the spindle and chuck is thereupon reversed, and as the spindle moves backward the pins $h$ engage the shoulders or stops $i$ of the tap head or holder, and so back the tap out. The connection between the tap-driver B and tap head or holder is such that the pin $g$ will be entirely disengaged from the shoulders * before the pins $h$ engage the shoulders $i$, and vice versa, and compensates for any differences between the feed of the spindle in which the device is carried and the feed of the tap due to its pitch. In some cases a chuck, A, of the kind described might be used to receive directly the shank of a tap, and so turn the same until the resistance became such as to cause the chuck to turn on the shank by reason of the yielding of the spring-fingers.

What I claim as my invention, and desire to secure by Letters Patent, is—

1. In a tapping device, the combination, with a chuck to be secured to a rotating spindle and having a polygonal socket formed by spring-jaws or elastic fingers, of a polygonal shank, by means of which a tap is to be turned, fitting in and to be driven by said chuck, substantially as herein described.

2. In a tapping device, the combination, with an externally screw-threaded chuck having a polygonal socket formed by spring-jaws or elastic fingers, of a grip ring or nut adjustable on the chuck to vary the elasticity of the said jaws or fingers, and a polygonal shank, by means of which a tap is to be turned, fitted to said chuck, substantially as herein described.

3. The combination, with a chuck having a polygonal socket and spring-jaws, of a tap-driver having a polygonal shank fitting said chuck, substantially as herein described.

4. The combination, with an externally screw-threaded tap-driver, of a ring or nut adjustable thereon, and a stirrup or piece secured to said ring or nut having an opening for the passage of a tap through it forming a stop to limit the entrance of a tap, substantially as herein described.

5. The combination, with a tap-driver, B, having a cylindric cavity, of the tap head or holder E, contained in said cavity and having the spiral projections $d$, the pin $g$, engaging with the ends * of said projection to turn the tap-head forward, and the pins or projections $h$, engaging with the ends $i$ of said spiral projections to turn the head backward, substantially as herein described.

JOHN H. RATHBUN.

Witnesses:
THOS. J. RIDER,
A. DE BONNEVILLE.